(No Model.)

J. W. WATTLES.
BEARING FOR SPINNING SPINDLES.

No. 372,729. Patented Nov. 8, 1887.

WITNESSES:

INVENTOR
Joseph W. Wattles
BY
ATTORNEY

UNITED STATES PATENT OFFICE.

JOSEPH WARREN WATTLES, OF CANTON, MASSACHUSETTS.

BEARING FOR SPINNING-SPINDLES.

SPECIFICATION forming part of Letters Patent No. 372,729, dated November 8, 1887.

Application filed March 12, 1887. Serial No. 230,608. (No model.)

*To all whom it may concern:*

Be it known that I, JOSEPH WARREN WATTLES, a citizen of the United States, and a resident of Canton, county of Norfolk, and State of Massachusetts, have invented certain new and useful Improvements in Bearings for Spinning Spindles, of which the following is a specification.

My invention relates to that form of spindle-bearings in which the bolster is prolonged and supports at its lower end the step for the spindle, and has for its object to simplify the construction of such devices and to produce a spindle-bearing of this class which shall permit of the spindle being run at a high rate of speed without vibration and the consumption of unnecessary power.

With this end in view my invention consists in the combination, hereinafter described and claimed, with a bolster-holder which is adapted to be secured to the spindle-rail and a bolster-tube rigidly and immovably secured within such holder, of a vertically-movable spindle-step, an elastic cushion for supporting the same, and devices for preventing the rotation of said step, all as will hereinafter more fully appear.

Figure 1:
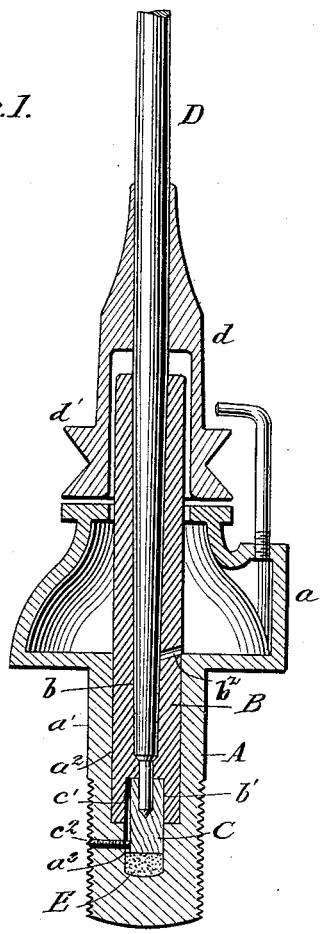
Figure 2:
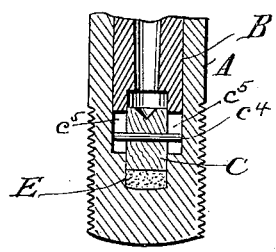

Referring to the drawings, Figure 1 illustrates a central sectional elevation of my invention, and Fig. 2 a detail showing a slightly-modified arrangement of parts for preventing the rotation of the step.

A indicates the holder, by means of which the spindle and its bearings are secured to the spindle-rail and held in proper relation with respect thereto. This holder may be of any of the well-known constructions usually employed in connection with this class of spindle-bearings. I prefer, however, to make use of that form illustrated in Letters Patent No. 257,909, as being the best suited to my purpose, the same being constructed with an oil-reservoir, $a$, in its upper end and with the shank $a'$, which is provided with the socket $a^2$ and recess $a^3$, as shown.

Fitted to the socket $a^2$, so as to be incapable of any lateral or other movement therein, is the bolster-tube B, which is preferably of cylindrical form and has a circular aperture, $b$, extending axially through the same and terminating at its lower end in an enlarged circular recess, $b'$.

The aperture $b$ is of the proper size to furnish a lateral or bolster bearing for the spindle D, which is fitted to rotate therein, and the recess $b'$ receives the step C, in which the lower end of said spindle rests. This step, instead of being fixedly secured in place, is so fitted to the recess $b'$ that while incapable of moving sidewise in any direction therein it is yet free to rise and fall slightly in the same, and in order to permit of its yielding to the action of the spindle when in operation, and at the same time to furnish an elastic support therefor, I interpose between such step and the bottom of the recess $a^3$ an elastic cushion, E. Various materials may be employed in the manufacture of this cushion. I prefer, however, to make use of felt or other fibrous material as being the cheapest and the least affected by the action of the lubricant thereon.

In order to prevent the rotation of the step C when the spindle is in operation, and thereby to obviate the destructive effects upon the cushion consequent upon such rotation, I employ the screw $c^2$, which, passing through the side of the shank $a'$ of the holder A, engages with the groove $c^3$, formed in the side of said step longitudinally of the same.

The spindle D shown by me is of the well-known form illustrated in Letters Patent No. 284,775, the same being provided with the usual sleeve, $d$, and whirl $d'$, which extend down and around the upper end of the bolster-tube. Any of the ordinary forms of sleeve-whirl spindle, however, may be employed, it only being necessary to shorten or lengthen the bolster-tube to adapt it for use in connection with such spindle.

The bolster-tube may be constructed of any suitable material—wood or metal. I prefer, however, to make it of wood, and in order to permit of the lubrication of the spindle I find it convenient to provide such tube with a duct, $b^2$, by means of which the lubricant is free to flow from the oil-reservoir $a$ to the interior of the same. By thus making use of a fixed and immovable bolster-tube with a yielding step I provide means for supporting the spindle which, while extremely simple and cheap in construction, permits of the spindle being driven at a high rate of speed, the yielding character of the step serving to neutralize the jar and trembling engendered by the rotation of the spindle, and the fixed bolster holding said spindle at all times in proper position.

In Fig. 2 is shown a slightly-modified arrangement of parts for preventing the rotation of the step C with the spindle D. In this construction the screw $c^2$ is dispensed with, and in lieu thereof a pin, $c^4$, is employed, which, passing transversely through the step C, engages with the slots $c^5 c^5$, formed in the lower end of the bolster-tube B, and securely holds said step from movement around its axis.

While I have shown the best means contemplated by me for carrying my invention into practice, I wish it distinctly understood that I do not limit myself strictly thereto, as it is obvious that the same may be modified in various ways without departing from the spirit thereof.

Having described my invention and one way in which it is or may be carried into effect, what I claim as new, and desire to secure by Letters Patent of the United States, is—

1. The combination, with a sleeve-whirl spindle and a bolster-holder, of a bolster-tube fixedly and immovably secured in said holder, a step for the spindle, provided with a groove in its side, a yielding cushion, upon which such step rests, and a screw for engaging with said groove, substantially as described.

2. The combination, with a spindle, D, and a bolster-holder, A, provided with the socket $a^2$ and recess $a^3$, of the bolster-tube B, fixedly and immovably secured in said holder, and having the circular aperture $b$ passing axially therethrough, and the recess $b'$ in its lower end, the vertically-movable step C, fitted to said recess, the elastic cushion E, arranged beneath the step and in the recess $a^3$, and devices for positively restraining the step from rotation, as and for the purpose set forth.

In testimony whereof I have hereunto set my hand this 26th day of February, 1887.

JOSEPH WARREN WATTLES.

Witnesses:
N. W. DUNBAR,
WALTER AMES.